United States Patent
Badger et al.

(10) Patent No.: US 11,407,485 B2
(45) Date of Patent: Aug. 9, 2022

(54) PLINDOW WITH OPAQUE PLUG

(71) Applicant: THE BOEING COMPANY, Chicago, IL (US)

(72) Inventors: Ashley G. Badger, Everett, WA (US); Steven E. Rhynard, Seattle, WA (US); G. Frank Sexton, Mukilteo, WA (US); Craig T. Brockett, Everett, WA (US); Shawn M. Pare, Woodinville, WA (US); Ryan A. Street, Mukilteo, WA (US); Andrew F. Szerlag, Marysville, WA (US)

(73) Assignee: THE BOEING COMPANY, Chicago, IL (US)

( * ) Notice: Subject to any disclaimer, the term of this patent is extended or adjusted under 35 U.S.C. 154(b) by 883 days.

(21) Appl. No.: 16/195,449

(22) Filed: Nov. 19, 2018

(65) Prior Publication Data
US 2019/0185133 A1    Jun. 20, 2019

Related U.S. Application Data

(63) Continuation of application No. 14/836,914, filed on Aug. 26, 2015, now Pat. No. 10,173,788.

(51) Int. Cl.
| | |
|---|---|
| B64C 1/14 | (2006.01) |
| B64D 47/08 | (2006.01) |
| H04N 7/18 | (2006.01) |
| B64D 11/00 | (2006.01) |
| H04N 5/225 | (2006.01) |

(52) U.S. Cl.
CPC ......... *B64C 1/1492* (2013.01); *B64C 1/1484* (2013.01); *B64D 11/0015* (2013.01); *B64D 47/08* (2013.01); *H04N 5/2257* (2013.01); *H04N 7/181* (2013.01); *B64D 2011/0061* (2013.01); *H04N 5/2254* (2013.01)

(58) Field of Classification Search
CPC . B64C 1/1484; B64C 1/1492; B64D 11/0015; B64D 2011/0061
See application file for complete search history.

(56) References Cited

U.S. PATENT DOCUMENTS

| | | | |
|---|---|---|---|
| 8,353,137 B2 * | 1/2013 | Boer | H04N 5/2252 52/204.5 |
| 9,505,497 B2 * | 11/2016 | DeMers | G09F 21/08 |
| 9,682,766 B2 * | 6/2017 | Apdalhaliem | B64C 1/1492 |
| 9,926,068 B2 * | 3/2018 | Desroches | B60J 1/007 |
| 9,996,754 B2 * | 6/2018 | Brauer | B64D 11/0015 |
| 10,419,667 B2 * | 9/2019 | Riedel | H04N 5/265 |
| 10,427,792 B1 * | 10/2019 | Young | B64D 11/0015 |
| 10,452,934 B1 * | 10/2019 | Brauer | H04N 5/2257 |
| 10,579,861 B2 * | 3/2020 | Kohlmeier-Beckmann | H04N 13/279 |
| 10,834,373 B2 * | 11/2020 | Ahlborn | G06K 9/00671 |
| 2007/0194177 A1 * | 8/2007 | Coak | B64C 1/1492 244/129.3 |
| 2009/0010494 A1 | 1/2009 | Bechtel et al. | |

(Continued)

FOREIGN PATENT DOCUMENTS

EP    3090947 A1 *  11/2016    ......... H04N 5/23238

*Primary Examiner* — Assres H Woldemaryam
*Assistant Examiner* — Aaron M Rodziwicz
(74) *Attorney, Agent, or Firm* — Patterson + Sheridan, LLP

(57) ABSTRACT

A porthole, a porthole plug in a vehicle, and an aircraft with portholes are provided. The porthole includes an opaque plug with an aperture therethrough.

20 Claims, 8 Drawing Sheets

(56) References Cited

U.S. PATENT DOCUMENTS

| | | | |
|---|---|---|---|
| 2009/0127386 A1* | 5/2009 | Cote | B64D 47/06 244/1 R |
| 2010/0188506 A1* | 7/2010 | Dwyer | H04N 7/18 348/144 |
| 2012/0092498 A1 | 4/2012 | Kanning et al. | |
| 2012/0111992 A1* | 5/2012 | Fry | F42B 15/01 244/3.16 |
| 2013/0168495 A1* | 7/2013 | Mueller | B60J 1/002 244/129.3 |
| 2013/0194381 A1 | 8/2013 | McMahon et al. | |
| 2015/0077337 A1* | 3/2015 | Coto-Lopez | G06F 3/017 345/156 |
| 2015/0123838 A1 | 5/2015 | Shi | |
| 2016/0011483 A1* | 1/2016 | Bertolini | B32B 17/10532 359/275 |
| 2017/0057660 A1 | 3/2017 | Badger et al. | |

* cited by examiner

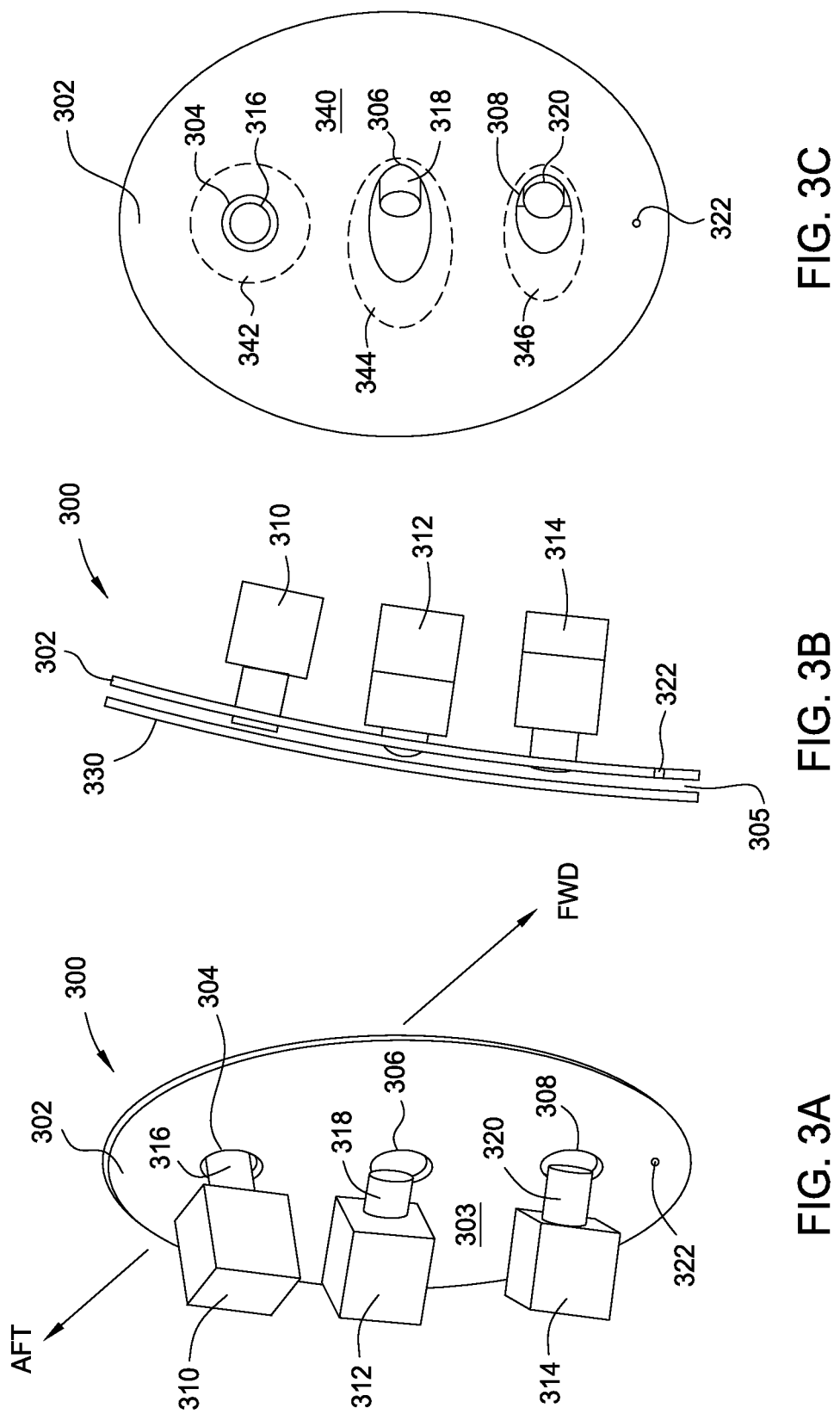

PLINDOW WITH OPAQUE PLUG

BACKGROUND

Aspects described herein relate to exterior view cameras, and more specifically, to an exterior view camera and camera mounting arrangement to allow passengers within a vehicle without a window view to see outside of the vehicle.

In various aircraft, certain passengers may not have access to a window view. For example, certain windows may be blocked by a monument (e.g., a lavatory, galley, or bulkhead wall) in the aircraft cabin. In various aircraft, passengers may be too distant from windows to see the windows. Such seats without window views may be less desirable than seats that provide such a window view. Also, in certain circumstances, passengers without an exterior view may become motion sick.

SUMMARY

According to one aspect, an aircraft includes first window porthole on a first side a fuselage of the aircraft that includes a first outer pane that is transparent and a first opaque plug in a facing relationship with the first outer pane where the first opaque plug includes a first aperture therethrough and where the first opaque plug blocks light from passing from the first outer pane into the fuselage except through the first aperture. The aircraft also includes a second window porthole on a second side of the fuselage of the aircraft that includes a second outer pane that is transparent and a second opaque plug in a facing relationship with the second outer pane where the second opaque plug includes a second aperture therethrough and where the second opaque plug blocks light from passing from the second outer pane into the fuselage except through the second aperture.

According to one aspect, a porthole in an aircraft having a passenger cabin includes a transparent outer pane comprising a first side establishing an external surface of the aircraft and an opaque plug in a facing relationship with a second side of the outer pane where the opaque plug includes a first aperture extending through the opaque plug, the opaque plug blocking light from passing from the outer pane into the passenger cabin except through the first aperture. The porthole also includes a seal disposed at perimeters of the outer pane and the opaque plug where the seal holds the outer pane and the opaque plug in a spaced apart relationship to form an air gap therebetween.

According to one aspect, a porthole plug in an vehicle having a passenger cabin includes a transparent outer pane and an opaque plug in a facing relationship with a first side of the outer pane where the opaque plug includes a first aperture extending through the opaque plug, the opaque plug blocking light from passing from the outer pane into the passenger cabin except through the first aperture and where a surface in the opaque plug forming the first aperture has one of a circular or elliptical shape.

BRIEF DESCRIPTION OF THE DRAWINGS

FIG. 3A is a perspective view of an opaque window plug for use in an aircraft window, wherein the opaque plug includes three apertures therethrough, and wherein a camera is arranged in each aperture;

FIG. 3B is a side view of the window plug and cameras of FIG. 3A arranged on an interior side relative to an exterior windowpane;

FIG. 3C is an exterior view of the window plug of FIG. 3A with the cameras visible through the respective apertures;

DETAILED DESCRIPTION

Figure 1A:
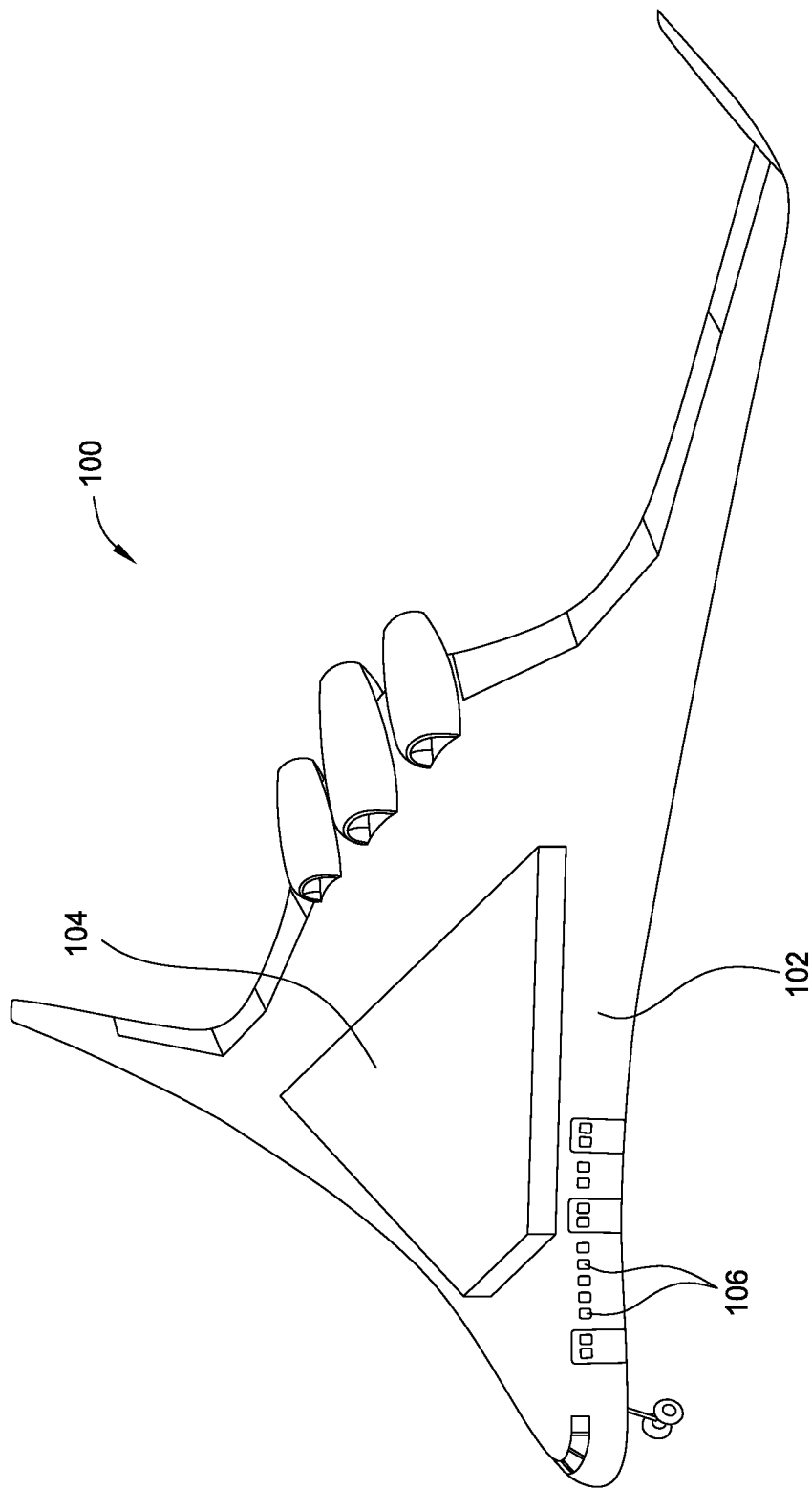
FIG. 1A is a perspective, partially transparent view of an aircraft.
Figure 1B:
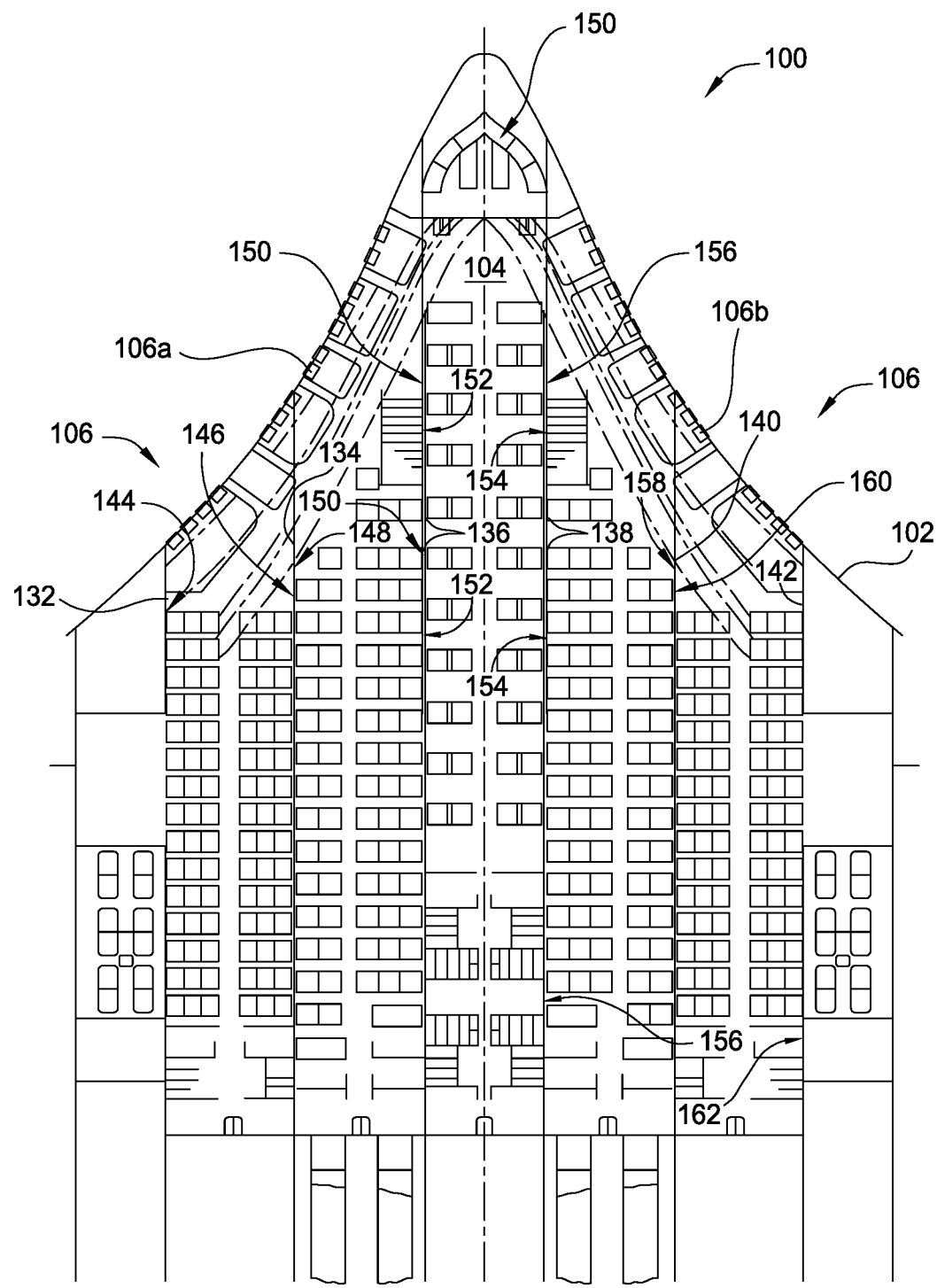
FIG. 1B is a plan view of cabin seating in a passenger compartment of the aircraft of FIG. 1.

As discussed above, in various aircraft (or other vehicles), passengers may not have access to a window view. FIG. 1A illustrates a blended body aircraft 100 that includes a fuselage 102 that defines an approximately square-shaped passenger cabin 104. FIG. 1B is a plan view of a seating arrangement in the blended body aircraft 100. The fuselage 102 includes a plurality of windows 106 along a leading edge. As shown in FIG. 1B, a small number of seats have direct views of the windows 106. Other seats do not include views of the windows 106. For example, views of the windows 106 from seats toward the rear of the passenger cabin 104 could be blocked by seats toward the front of the passenger cabin. As another example, bulkhead walls 134, 136, 138, and 140 in the passenger cabin 104 could block views of the windows 106 from particular seats.

In various aspects, certain windows could be replaced with outward-viewing cameras. For example, a window 106a on the port side of the fuselage 102 and a window 106b on the starboard side of the fuselage 102 could be replaced with cameras. Images from the cameras could be transmitted for view in the passenger cabin 104. For example, images from a port-facing camera or cameras in the window 106a on the port side of the fuselage 102 could be projected on a port-facing wall 144 of a bulkhead 132 on a port end of the passenger cabin 104, on a port-facing wall 148 of the bulkhead wall 134, on port-facing walls 152 of the bulkhead walls 136, on port-facing walls 156 of the bulkhead walls 138, and on a port-facing wall 160 of the bulkhead wall 140. As another example, images from a starboard-facing camera or cameras in the window 106b on the starboard side of the fuselage 102 could be projected on a starboard-facing wall 146 of the bulkhead 134, on starboard-facing walls of the bulkhead walls 136, on starboard-facing walls 154 of the bulkhead walls 138, on a starboard-facing wall 158 of the bulkhead wall 140, and on a starboard-facing wall 142 of a bulkhead on the starboard end of the passenger cabin. In various aspects, a plurality of video monitors (e.g., Liquid Crystal Display (LCD) flat panel displays or Organic Light Emitting Diode (OLED) displays) could be arranged on the bulkhead walls 132, 134, 136, 138, 140, and 142 to display the images from the port-facing camera in the window 106a and the starboard-facing camera in the window 106b. In various aspects, the port-facing camera(s) could be hard-wired to the displays on the port-facing walls such that the displays on the port-facing walls always show images from the port-facing cameras. Similarly, the starboard-facing camera(s) could be hard-wired to the displays on the starboard-facing walls such that the displays on the starboard-facing walls always show images from the starboard-facing cameras. In various aspects, the camera(s) could be in communication with a switch and each of the monitors could be in communication with the switch such that either the port-facing images or the starboard-facing images could be selectively displayed on any monitor. In addition to or in the alternative, the images from the cameras could be transmitted from the switch to individual displays associated with individual seats in the passenger cabin 104, and the passengers in the seats could select the port-facing view, the starboard-facing view, or both views for display on the screen. In addition to providing the images to displays in the passenger cabin 104, the switch could transmit the images from the camera(s) to a display on the flight deck 150 of the aircraft 100.

In various aspects, the cameras could be arranged in a window (i.e., a porthole) in the aircraft that is otherwise blocked. For example, the windows 106a and 106b in the exemplary arrangement shown in FIG. 1B could be blocked by a lavatory, galley, or other monument such that the windows 106a and 106b would not be visible. In such aspects, as described in greater detail below, opaque plugs could be placed in the windows 106a and 106b. The opaque plugs could include apertures therethrough to provide a view for the above-described cameras.

Figure 2A:
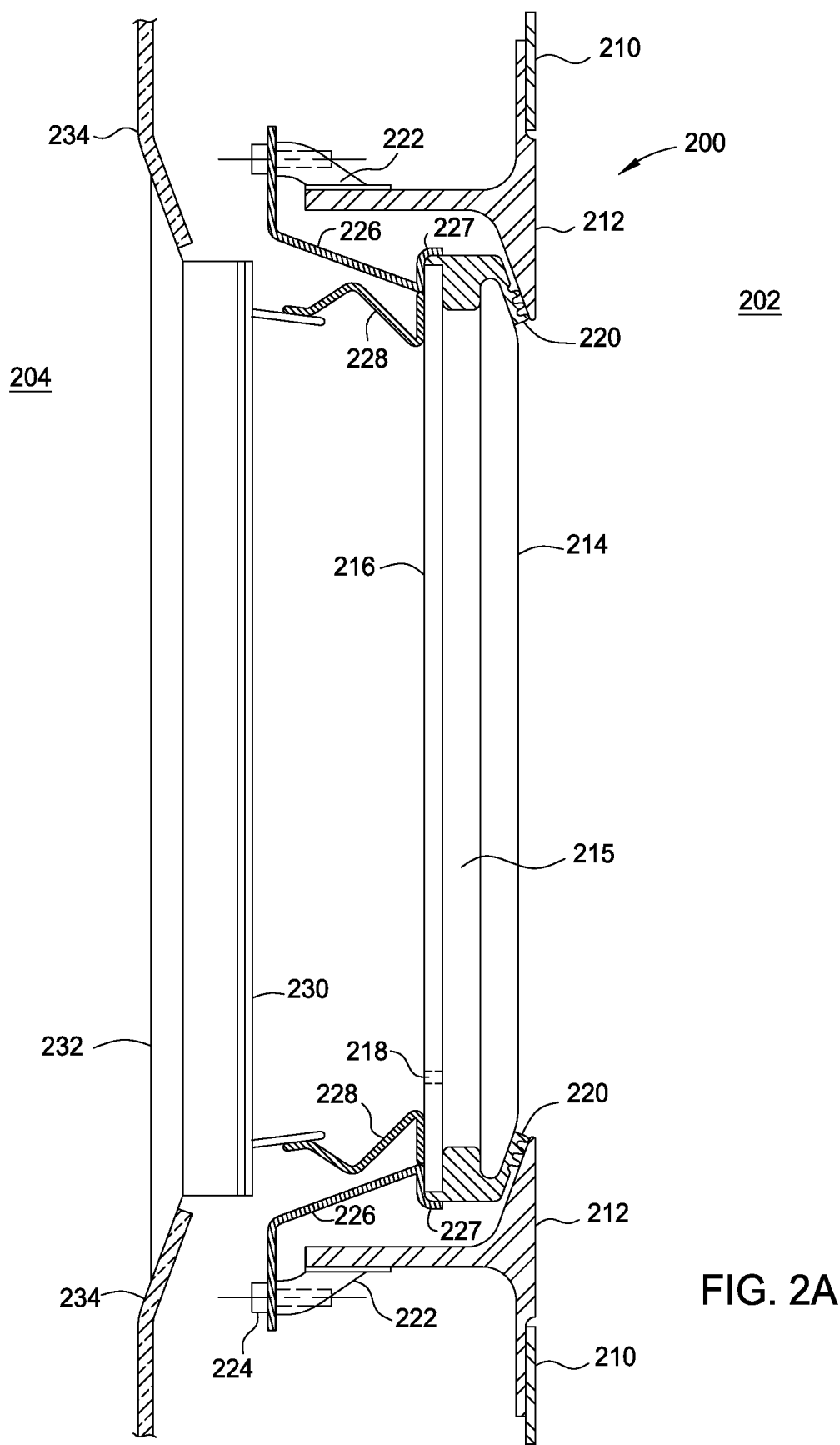
FIG. 2A is a cross-sectional side view of a window for a pressurized aircraft.

FIG. 2A illustrates a cross-sectional side view of a porthole arrangement 200 for a pressurized aircraft. The porthole arrangement 200 includes a porthole forging 212 arranged in the skin 210 of the fuselage (e.g., fuselage 102 in FIG. 1) of the aircraft 100. The porthole forging 212 can be attached to the skin 210 of the fuselage by rivets, welding, adhesives, or the like. The porthole arrangement 200 includes a transparent outer pane 214 of glass, acrylic, PLEXIGLAS® acrylic, or another suitable material, and a transparent middle pane 216 of glass, acrylic, PLEXIGLAS® acrylic, or another suitable material. The outer pane 214 and the middle pane 216 are surrounded by a seal 220 made of a resilient material, such as rubber, silicone, or another suitable material. The seal 220 holds the outer pane 214 and the middle pane 216 in a spaced apart relationship to one another with an air gap 215 therebetween. The seal 220 also presses and seals against the porthole forging 212, thereby creating a seal that prevents air from leaking past the porthole panes 214 and 216.

In various circumstances, the outer pane 214 withstands a pressure differential from an interior 204 of the aircraft to the exterior 202 of the aircraft, and the middle pane 216 is a backup for the outer pane 214 and is also capable of withstanding the pressure differential. The middle pane 216 can include a vent hole 218 therethrough that allows air to flow into and out of the air gap 215 between the outer pane 214 and the middle pane 216 so that there is no pressure differential across the middle pane 216. The seal 220, the outer pane 214, and the middle pane 216 are held in place by one or more spring clips 226. The one or more spring clips 226 are attached to brackets 222 extending from the porthole forging 212 by fasteners 224. An opposite end of the one or more spring clips 226 presses against the seal 220 and/or the middle pane 216. The force of the one or more spring clips 226 pressing against the seal 220 and/or the middle pane 216 urges the seal 220 into sealing contact with the porthole forging 212. The one or more spring clips 226 can include lips 227 that wrap around an outer perimeter of the seal 220 to locate the seal 220, the outer pane 214, and the middle pane 216 relative to the porthole forging 212.

The porthole arrangement can also include a dust cover 230. The dust cover 230 is a nonstructural porthole pane in the interior 204 of the aircraft. The dust cover 230 is touchable by passengers within the aircraft and provides protection for the middle pane 216 and the outer pane 214. The dust cover 230 is surrounded by a trim ring 232 that abuts an interior side wall panel 234 in the passenger cabin. A rubber seal 228 is arranged between the middle pane 216 and the dust cover 230. The rubber seal 228 prevents light coming through the outer pane 214 and the middle pane 216 from impinging on a backside of the interior side wall panel 234, which could cause the interior side wall panel 234 to appear to glow. Currently, the outer pane 214 and the middle pane 216 of the porthole arrangement 200 are "damage obvious" components, meaning that they must be inspectable for obvious damage at least daily by flight attendants, maintenance personnel, or others walking through the aircraft.

Figure 2B:
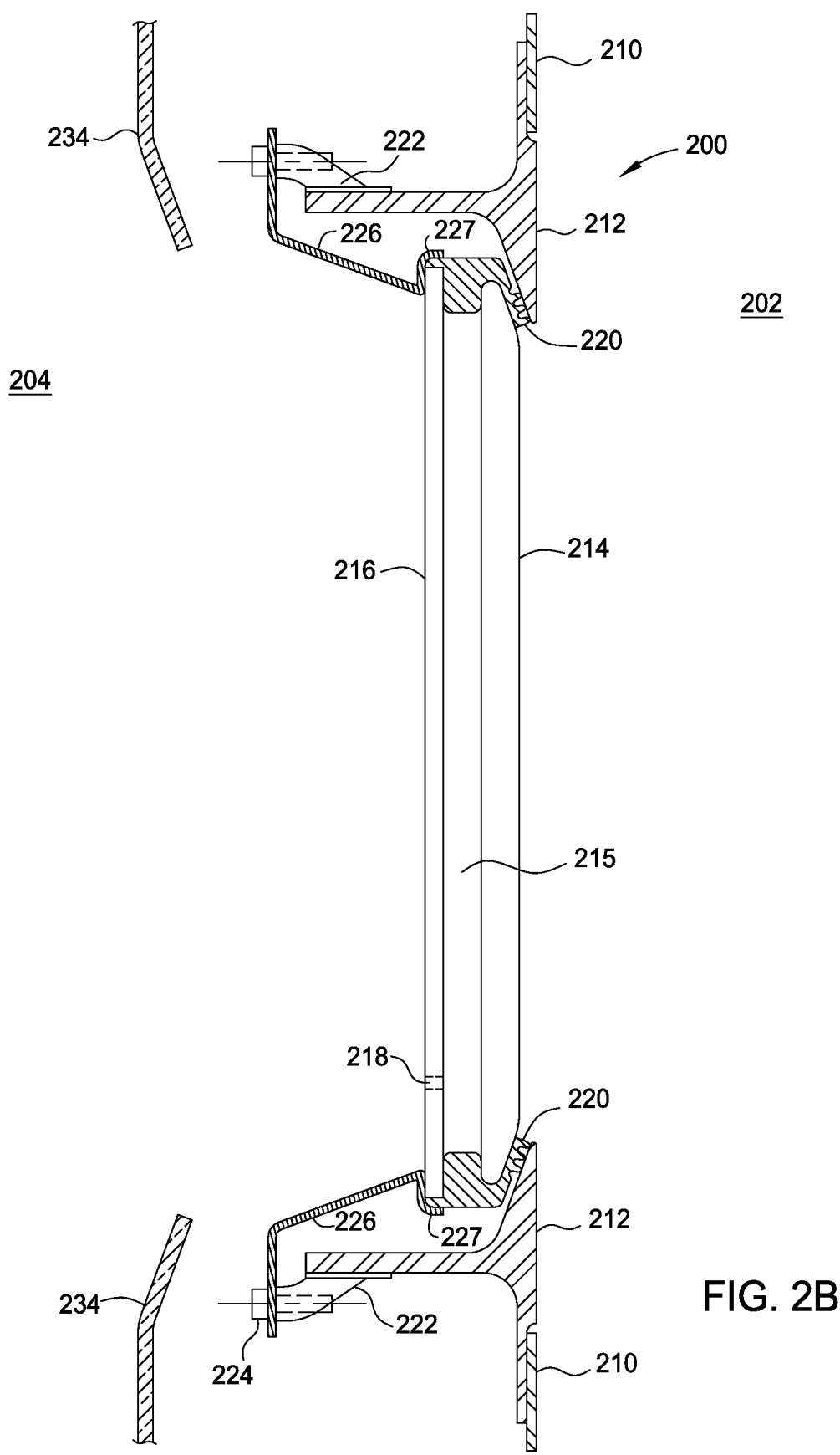
FIG. 2B is a cross-sectional side view of the window of FIG. 2A with a trim ring, dust cover, and rubber seal removed.
Figure 2C:
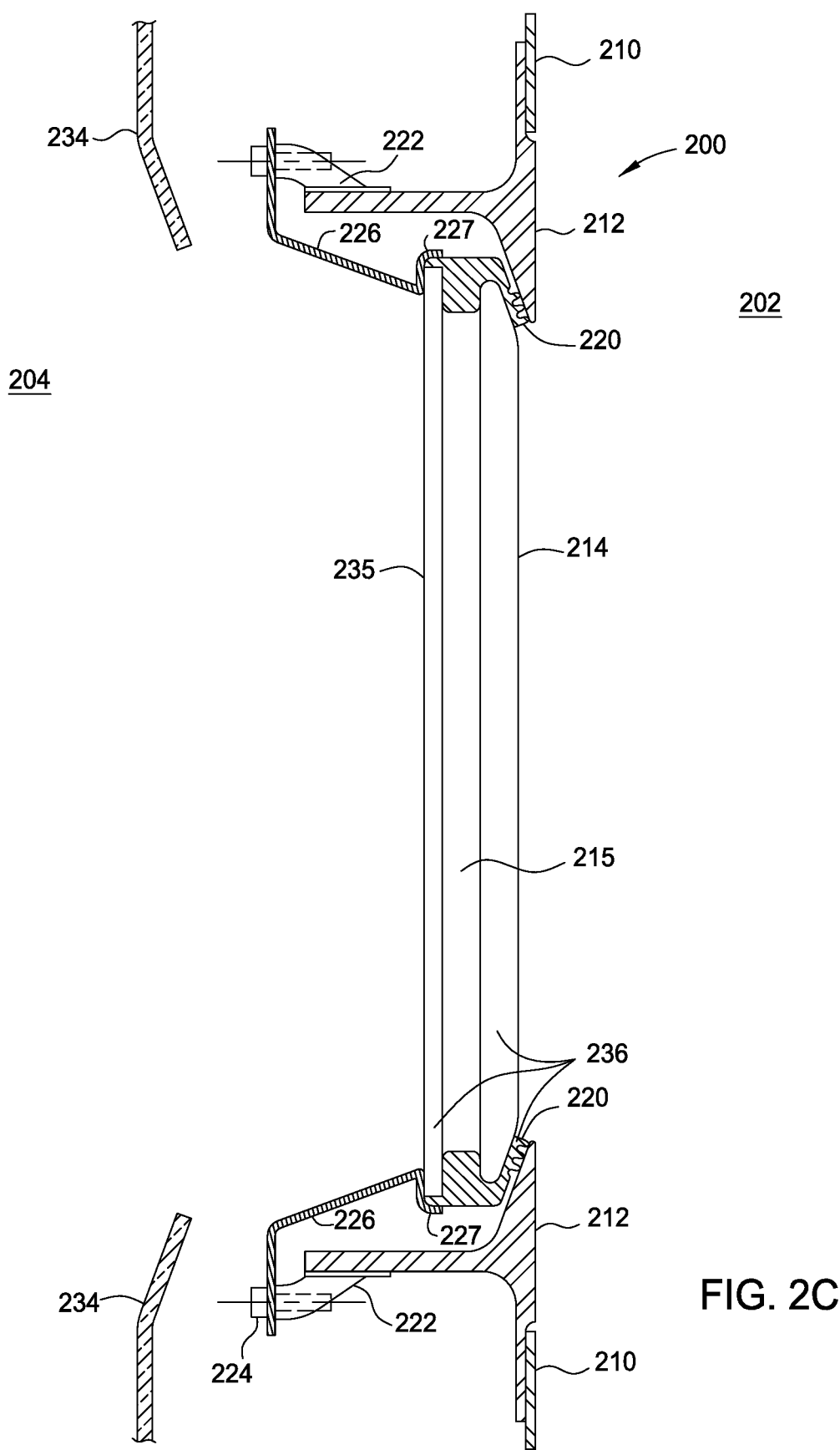
FIG. 2C is a cross-sectional side view of the window of FIG. 2B with the transparent middle pane replaced by an opaque plug.

In various aspects described herein, a porthole location that is blocked by a bulkhead (e.g., the bulkheads of the suites shown in FIG. 1) can be modified to include a plug and a camera system. The trim ring 232, dust cover 230, and rubber seal 228 can be removed or omitted, as shown in FIG. 2B. Furthermore, as shown in FIG. 2C, the transparent middle pane 216 can be replaced by an opaque plug 235, which is commonly referred to as a plug. The opaque plug 235 could be made of aluminum, titanium, or the like. The assembly of the opaque plug 235, transparent pane 214, and seal 220 is a plug-window hybrid referred to herein as a "plindow" 236. As will be discussed in greater detail below, the opaque plug includes one or more apertures therethrough. Cameras can be aligned with the apertures such that the cameras can receive images through the opaque plug and the outer pane 214. Furthermore, by forming the opaque plug from a metal like aluminum or titanium, the opaque plug is not a "damage obvious" component and does not need daily inspection.

FIGS. 3A-3C illustrate a camera arrangement 300 that includes an opaque plug 302 with at least one camera aperture, such as three camera apertures 304, 306, and 308 formed therethrough. As discussed above, the opaque plug 302 replaces the middle pane (e.g., middle pane 216) in a porthole arrangement for a pressurized aircraft. In various aspects, the opaque plug 302 can include a vent hole 322 to allow air to flow to and from an air gap 305 between the opaque plug 302 and a transparent outer pane 330. The camera arrangement 300 shown in FIGS. 3A-3C includes at least one camera, such as a first camera 310, a second camera 312, and a third camera 314. As shown, the first camera 310 is arranged at a first angle relative to the opaque plug 302, the second camera 312 is arranged at a second angle relative to the opaque plug 302, and the third camera 314 is arranged at a third angle relative to the opaque plug 302. For example, the first camera 310 has a lens 316 arranged at a substantially orthogonal angle relative to the opaque plug 302. The second camera 312 has a lens 318 arranged at an angle substantially toward a forward direction (indicated by arrow FWD) relative to the opaque plug 302. The third camera 314 has a lens 320 arranged at an angle in the forward direction but at a lesser angle than the second camera 312. As shown the second camera 312 and the third camera 314 are pointed in the forward direction. In various aspects, one or more of the cameras could be oriented in a rearward direction or another direction.

Referring primarily to FIG. 3C, an exterior surface 340 of the opaque plug 302 can be painted or otherwise covered with a substantially reflective surface. For example, in certain aspects, the substantially reflective exterior surface 340 could have an albedo (the ratio of reflected radiation from a surface to incident radiation upon it) of between 50% and 100%. As another example, the substantially reflective exterior surface 340 could have an albedo between 70% and 90%. As another example, the substantially reflective exterior surface 340 could have an albedo between 75% and 80%. In various aspects, the exterior surface 340 of the opaque plug 302 can be made substantially reflective by painting the exterior surface 340 in a white or otherwise light-colored paint. For commercial aircraft, exterior paint schemes are often a particular shade of white. Also, window shades are often a particular shade of white. In various aspects, the exterior surface 340 could be painted using the same particular shade of white as the exterior paint scheme of the aircraft and/or of the window shade. In various aspects, the exterior surface 340 could be mirrored, chrome plated, polished, or the like to provide a substantially reflective surface. By having a substantially reflective exterior surface 340, the opaque plug 302 can reduce the amount of heat absorbed by the opaque plug 302 and transferred to the cameras 310, 312, and 314 located behind the opaque plug 302.

To minimize reflections on the outer pane 330 that could degrade the images obtained by the cameras 310, 312, and 314, the apertures 304, 306, and 308 in the opaque plug 302 can be surrounded by regions on the exterior surface 340 that substantially absorb light. For example, in certain aspects, the substantially light-absorbing regions could have an albedo of between 0% and 50%. As another example, the substantially light-absorbing regions could have an albedo between 10% and 40%. As another example, the substantially light-absorbing regions could have an albedo between 15% and 25%. The substantially light-absorbing regions could be a coating applied to the exterior surface 340 of the opaque plug 302. For example, the coating could be a paint applied to the exterior surface 340 or a different material that is electroplated, adhered, or otherwise attached to the exterior surface 340.

For example, FIG. 3C illustrates a first substantially light-absorbing region 342 surrounding the first aperture 304 in the opaque plug 302. The first substantially light-absorbing region 342 is formed in a substantially circular shape around the aperture 304. As discussed above, the lens 316 of the first camera 310 points out at a substantially orthogonal angle relative to the opaque plug 302. Thus, the first substantially light-absorbing region 342 is arranged equally around the circular aperture 304 to reduce reflections of the opaque plug 302 on the transparent outer pane 330 that may be visible to the lens 316 of the camera 310. The second aperture 306 has an elongated oval shape to enable the lens 318 of the second camera 312 to be arranged at the angle relative to the opaque plug 302. Similarly, a second substantially light-absorbing region 344 surrounding the second aperture 306 is oval in shape and is oriented in the direction in which the lens 318 of the camera 312 is pointed. By orienting the position and shape of the second light-absorbing region 344, reflections of the opaque plug 302 on the transparent outer pane 330 that may be visible to the lens 318 of the second camera 312 may be reduced.

As discussed above, the third camera 314 is arranged at an angle that is between the angle of the first camera 310 and angle of the second camera 312. A third substantially light-absorbing region 346 surrounds the third aperture 308. The third substantially light-absorbing region 346 is oval shaped and oriented in the direction in which the lens 320 of the third camera 314 is pointed. The orienting of the third substantially light-absorbing region 346 is less than the orienting of the second substantially light-absorbing region 344 because of the lesser angle of the third camera 314 relative to the second camera 312. The apertures 304, 306, and 308 and the substantially light-absorbing regions 342, 344, and 346 are illustrated as being circular or oval in shape. In various aspects, the apertures 304, 306, and 308 and the substantially light-absorbing regions 342, 344, and 346 could have other shapes, such as ellipses, polygons, squares, rectangles, parallelograms, and trapezoids.

Figure 4A:
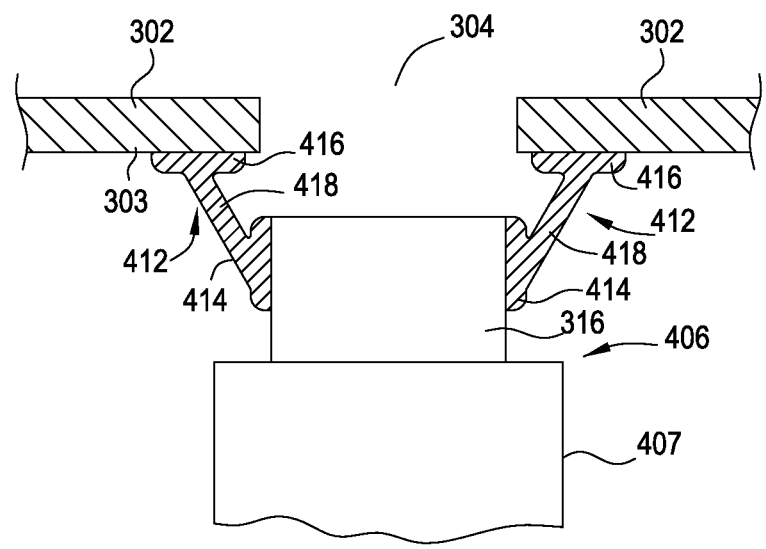
FIG. 4A is a top view of a portion of an opaque window plug and an aperture formed through the window, wherein a camera is aligned with the aperture, and wherein a resilient boot surrounds a lens of the camera and the aperture.
Figure 4B:
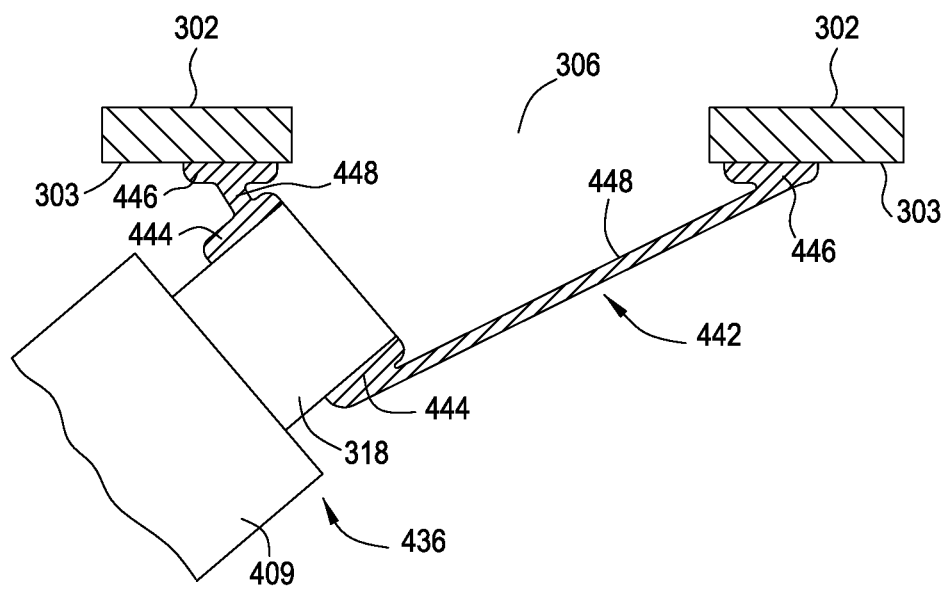
FIG. 4B is a top view of a portion of an opaque window plug and an aperture formed through the window, wherein a camera is aligned with the aperture and at an angle relative to the window plug, and wherein a resilient boot surrounds and the camera and the aperture.

Referring to FIGS. 4A and 4B, in various aspects, sealing elements that at least partially blocks light and/or air can be arranged between the lenses (or lens housings) of the cameras and an interior surface of the opaque plug. In FIGS. 4A and 4B, the sealing element is a resilient boot that is arranged in contact with the lenses (or lens housings) of the cameras and with an interior surface of the opaque plug. In various aspects, the sealing element could be a resilient seal, a gasket, or the like, that blocks light and/or air. FIG. 4A illustrates a camera 406 aligned with an aperture 304 in an opaque plug 302. The camera 406 includes a lens 316 pointed toward the opaque plug 302 and a body 407 attached to the lens 316. The camera 406 in FIG. 4A is oriented at a substantially perpendicular angle to the opaque plug 302. A boot 412 is arranged between the lens 316 of the camera 406 and an interior surface 303 of the opaque plug 302. The boot 412 includes a proximal end 414 arranged over the lens 316. The boot 412 includes a body 418 extending away from the lens 316. The boot 412 includes a distal end 416 that is in contact with the interior surface 303 of the opaque plug 302. In various aspects, the proximal end 414 of the boot 412 is attached to the lens 316. For example, the boot 412 may be made of a flexible material, such as rubber, silicone, or other suitable material, and the proximal end 414 may include a dimension that is slightly smaller than an exterior dimension of the lens 316. During assembly, the proximal end 414 of the boot 412 can be stretched to fit around the lens 316. Friction between the proximal end 414 of the boot 412 and the lens 316, aided by tension of the stretched proximal end 414, holds the boot 412 to the lens 316. The lens 316 and the interior surface 303 of the opaque plug 302 can be spaced apart such that the distal end 416 of the boot 412 is pressed against the interior surface 303. In various other aspects, the distal end 416 of the boot 412 can be attached to the interior surface 303 of the opaque plug 302, and the lens 316 of the camera 406 can fit within the proximal end 414 of the boot 412 when the camera 406 is aligned with the opaque plug 302.

FIG. 4B illustrates a camera 436 aligned with an aperture 306 in an opaque plug 302. The camera 436 includes a lens 318 pointed toward the opaque plug 302 and a body 409 attached to the lens 318. The camera 436 in FIG. 4B is oriented at a non-orthogonal angle relative to the opaque plug 302. A boot 442 is arranged between the lens 318 of the camera 436 and an interior surface 303 of the opaque plug 302. The boot 442 includes a proximal end 444 arranged over the lens 318, a body 448 extending from the proximal end 444, and a distal end 446 in contact with an interior surface 303 of the opaque plug 302. Due to the angle of the lens 318 relative to the opaque plug 302, the geometry of the boot 442 installed between the lens 318 in the opaque plug 302 is not symmetric about the lens 318. In various aspects, the boot 442 could be custom-shaped for the particular non-orthogonal angle of the camera 436 relative to the opaque plug 302. In various other aspects, the boot 442 could be a standardized boot, used for a camera arranged at any angle or a camera arranged at an angle within a range of angles, wherein the body 448 of the boot 442 is sufficiently flexible to accommodate different angles.

The boots 412 and 442 shown in FIGS. 4A and 4B reduce the amount of light that can pass through the apertures 304 and 306 into an interior space behind the opaque plugs 302 and 302. By minimizing such light leaks, the heat load in the interior space can be reduced. Furthermore, in the event that an exterior pane (e.g., outer pane 214 shown in FIG. 2A) develops a leak, the boots 412 and 442 can reduce air leaks from a pressurized aircraft cabin. For example, referring to FIG. 4A, a pressure differential across the boot 412 (with relatively high pressure on the side of the boot 412 with the camera body 310 and relatively low pressure on the side of the boot 412 with the aperture 304) would urge the distal end 416 of the boot 412 into tighter contact with the interior surface 303 of the opaque plug 302 and would urge the proximal end 414 of the boot 412 into tighter contact with the lens 316. These tight contacts between the boot 412, the interior surface 303 of the opaque plug 302, and the lens 316 can reduce the amount of pressurized air that might escape in the event that the outer pane develops a leak.

Figure 5:
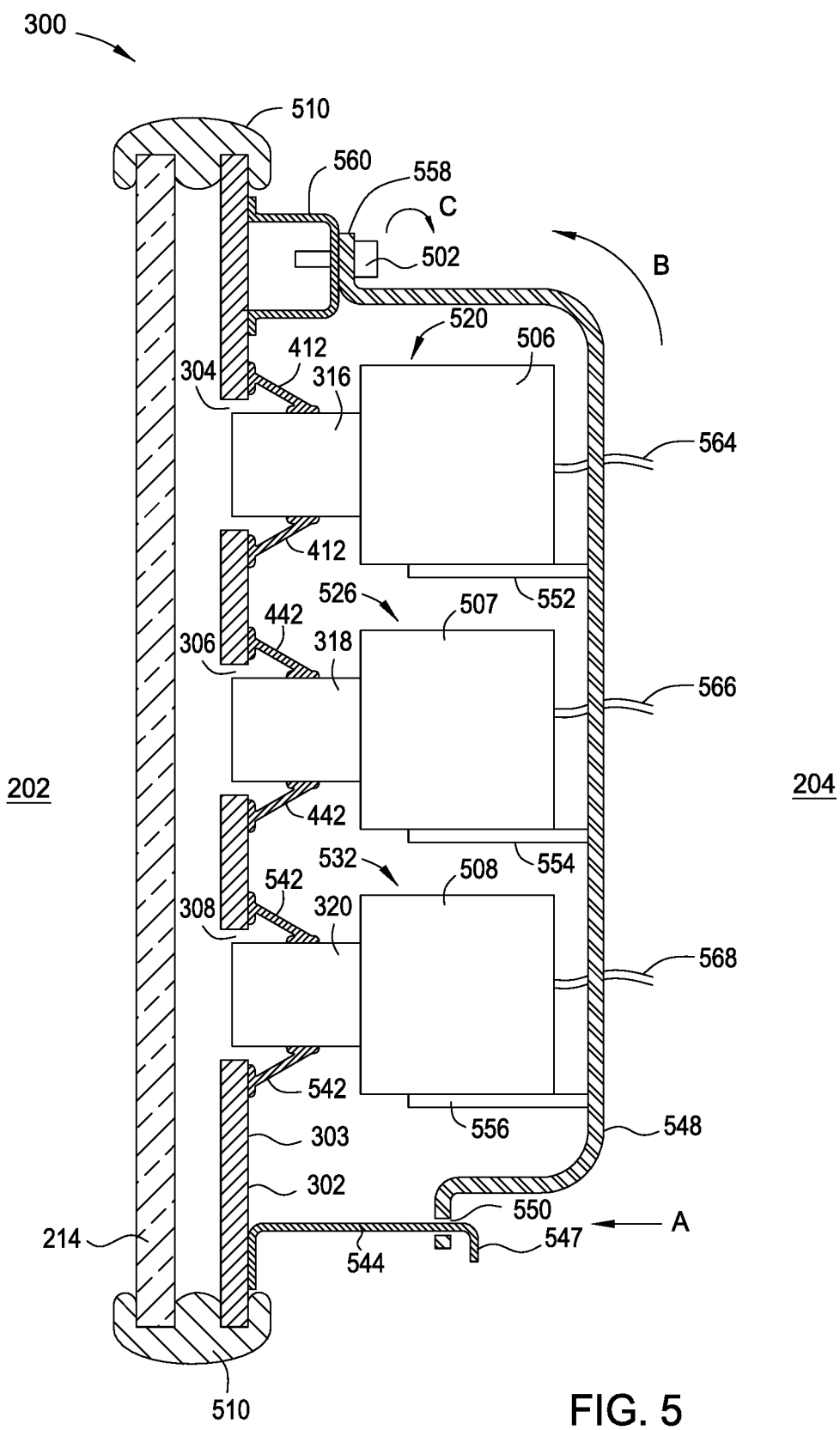
FIG. 5 is a cross-sectional side view of an opaque window plug arranged in an aircraft window, wherein cameras are attached to a camera bracket that aligns lenses of the cameras with apertures in the window plug.

FIG. 5 is a cross-sectional side view of the camera arrangement 300 that includes an opaque plug 302 that is installed in a porthole of an aircraft. Again, reference number 202 indicates the exterior side of the aircraft and reference 204 indicates the interior side of the aircraft 100. For clarity, only portions of the porthole are shown. Specifically, the transparent outer pane 214 and a porthole seal 510 (which may be the same as the porthole seal 220 shown in FIGS. 2A-2C or different) of a porthole are disclosed, but other portions (e.g., portions shown in FIG. 2A) are omitted. In the porthole camera arrangement 500, a transparent middle pane (e.g., middle pane 216 shown in FIG. 2A) has been replaced in the porthole seal 510 with the opaque plug 302. The opaque plug 302 has at least one aperture, such as the first aperture 304, the second aperture 306, and the third aperture 308. Mounting hardware for a camera bracket is attached to an interior surface 303 of the opaque plug 302. For example, the opaque plug 302 includes a first bracket 544 attached to and/or extending from the interior surface 303. The first bracket 544 includes a curved end 546. The opaque plug 302 also includes a second bracket 560 attached to and/or extending away from the interior surface 303. A camera bracket 548 can be attached to the first bracket 544 and the second bracket 560 of the opaque plug 302.

The camera bracket 548 includes a slot 550 that can engage the curved end 546 of the first bracket 544 (in the direction indicated by arrow A). Once the slot 550 has engaged the curved end 546, the camera bracket 548 can be moved in the direction of arrow B (e.g., pivoted about the engaged slot 550 and curved end 546) to align a flange 558 of the camera bracket 548 with the second bracket 560 on the opaque plug 302. A fastener 562 can attach to the flange 558 and the second bracket such that the camera bracket 548 is attached to the opaque plug 302. The fastener 562 could be captive within the flange 558, meaning that the fastener is always engaged with the flange 558. Furthermore, the fastener 562 could engage the second bracket 560 of the opaque plug 302 with a minimum number of turns. For example, the fastener 562 could include a bayonet-style fastening arrangement with the bracket 560 such that the fastener 562 can engage the second bracket 560 with only a fraction of a turn. Using a captive fastener 562 that only requires a fractional turn could be advantageous in circumstances where a worker installs the camera bracket 548 in a confined space (e.g., behind a bulkhead of a suite).

The camera bracket 548 includes mounting surfaces for cameras. In the aspect shown in FIG. 5, the camera bracket 548 includes at least one mount surface, such as three mounting surfaces for three cameras. A first mounting surface 552 extends from the camera bracket 548 toward the opaque plug 302 and supports a first camera 520. The body 506 of the first camera 520 is attached to the first mounting surface 552 such that the lens 316 of the camera 520 is aligned with the first aperture 304 of the opaque plug 302 when the camera bracket 548 is attached to the opaque plug 302. The first mounting surface 552 can also arrange the first camera 520 at an angle relative to the opaque plug 302. For example, in the camera arrangement shown in FIGS. 3A-3C, the first camera 520 is arranged perpendicular to the opaque plug 302. In FIG. 5, the first mounting surface 552 could align the first camera 520 perpendicular to the opaque plug 302 (or at any other angle).

A second mounting surface 554 extends from the camera bracket 548 toward the opaque plug and supports a second camera 526. The body 507 of the second camera 526 is attached to the second mounting surface 554 such that the lens 318 of the camera 526 is aligned with the second aperture 316 of the opaque plug 302 when the camera bracket 548 is attached to the opaque plug 302. The second mounting surface 554 can also arrange the second camera 526 at an angle relative to the opaque plug 302. For example, in the camera arrangement shown in FIGS. 3A-3C, the second camera 312 is arranged at a non-orthogonal angle relative to the opaque plug 302. In FIG. 5, the second mounting surface 554 could align the second camera 526 at a similar angle to the opaque plug 302 (or at any other angle).

A third mounting surface 556 extends from the camera bracket 548 toward the opaque plug 302 and supports a third camera 532. The body 508 of the third camera 532 is attached to the third mounting surface 556 such that the lens 320 of the camera 532 is aligned with the third aperture 308 of the opaque plug 302 when the camera bracket 548 is attached to the opaque plug 302. The third mounting surface 556 can also arrange the third camera 532 at an angle relative to the opaque plug 302. For example, in the camera arrangement shown in FIGS. 3A-3C, the third camera 314 is arranged at a non-orthogonal angle relative to the opaque plug 302. In FIG. 5, the third mounting surface 556 could align the third camera 532 at a similar angle to the opaque plug 302 (or at any other angle).

The three cameras shown in FIG. 5 include boots arranged in contact with respective lenses of the cameras and with the interior surface 303 of the opaque plug 302. For example, the first boot 412 is arranged in contact with the interior surface 303 of the opaque plug 302 and with the lens 316 of the first camera 520. As another example, the second boot 442 is arranged in contact with the interior surface 303 of the opaque plug and with the lens 318 of the second camera 526. As another example, a third boot 542 is arranged in contact with the interior surface 303 of the opaque plug 302 and with the lens 320 of the third camera 532. As discussed above, in various aspects, the boots 412, 442, and 542 are attached to the respective lenses 316, 318, and 320 of the cameras 520, 526, and 532. When the camera bracket 548 is installed on the brackets 544 and 560 of the opaque plug 302, the boots 412, 442, and 542 can contact interior surface 303 of the opaque plug 302.

The camera bracket 548 can include holes for cables to extend to/from the cameras. For example, the cables could transmit power to the cameras 520, 526, and 532. The cables could also transmit video images from the cameras 520, 526, and 532. A first cable 564 is shown extending through the camera bracket 548 to the first camera 520. A second cable 566 is shown extending through the camera bracket 548 to the second camera 526. A third cable 568 is shown extending through the camera bracket 548 to the third camera 532.

In various aspects, the cameras 520, 526, and 532 can be installed on the first mounting surface 552, the second mounting surface 554, and the third mounting surface 556, respectively. The cables 564, 566, and 568 could also be attached to the respective cameras and/or passed through the holes in the camera bracket 548. Also, the boots 412, 442, and 542 could be mounted to the lenses of the respective cameras. After the cameras are attached to the mounting surfaces with the boots in place and with the wiring arranged, the camera bracket can be moved to the porthole location that includes the opaque plug 302. Thereafter, the camera bracket 548 can be installed on the opaque plug 302. Again, the camera bracket 548 can be installed by engaging the slot 550 in the camera bracket with the curved end 546 of the first bracket 544 extending from the interior surface 303 of the opaque plug 302. The flange 558 of the camera bracket 548 can engage the second bracket 560 extending from the opaque plug 302, and the fastener 562 can be engaged (e.g., turned in the direction of arrow C) to attach the camera bracket 548 to the opaque plug 302. The above-described camera bracket allows for simple installation and alignment of the cameras with the opaque plug in a relatively cramped installation environment. Furthermore, the camera bracket allows for easy removal of the cameras in the event a camera needs to be replaced, repaired, etc.

The camera arrangement 500 shown in FIG. 5 minimizes light leaks into the interior 204 of an aircraft. For example, as described above, the apertures 304, 306, and 308 may allow a small amount of light from the exterior 202 of the aircraft to pass through. However, the boots 412, 442, and 542 block most of that light. The camera bracket 548 and the brackets 544 and 560 attached to the opaque plug 302 can block any remaining light impinging thereon. By blocking the light, undesirable light leaks in the cabin can be avoided. Furthermore, undesirable interior heating caused by such light leaks can be avoided. The camera arrangement also blocks the transfer of air into the area between the transparent pane and the camera lens, preventing moist air from entering the area and condensing on the camera lens.

In the aspects shown in FIG. 3A-3C and 5, three cameras are aligned with the apertures in an opaque plug. In various other aspects, a single camera, two cameras, or more than three cameras could be aligned with corresponding numbers of apertures in an opaque plug.

In various aspects, the opaque plugs described herein could be used in conjunction with systems other than cameras. For example, in an instance where a porthole will be blocked by interior bulkheads, the middle pane can be replaced with an opaque plug having one or more apertures, and the apertures could be used for various antenna used by the aircraft. For example, a traffic collision avoidance system (TCAS) antenna could be arranged in an aperture in an opaque plug to provide a side view for such an antenna. As another example, a VHF radio antenna, a UHF radio antenna, or the like could be arranged in an aperture in an opaque plug.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to certain aspects, other and further aspects may be devised without departing from the basic scope thereof, and the scope thereof is determined by the claims that follow.

What is claimed is:

1. An aircraft, comprising:
   a fuselage;
   a first window porthole on a first side of the fuselage, the first window porthole comprising:
      a first outer pane that is transparent, and
      a first opaque plug in a facing relationship with the first outer pane, wherein the first opaque plug comprises a first aperture, which passes through the first opaque plug, and wherein the first opaque plug prevents light from passing from the first outer pane into the fuselage except through the first aperture; and
   a second window porthole on a second side of the fuselage of the aircraft, the second window porthole comprising:
      a second outer pane that is transparent, and
      a second opaque plug in a facing relationship with the second outer pane, wherein the second opaque plug comprises a second aperture therethrough, and wherein the second opaque plug prevents light from passing from the second outer pane into the fuselage except through the second aperture.

2. The aircraft of claim 1, wherein:
   the first opaque plug further comprises an outer surface that substantially reflects light passing through the first outer pane, and
   a region of the outer surface, surrounding the first aperture, substantially aborbs light.

3. The aircraft of claim 1, wherein:
   the first opaque plug further comprises a third aperture, extending through the first opaque plug;

the first opaque plug prevents light from passing from the first outer pane into the fuselage, except through the first aperture and the third aperture;

the second opaque plug further comprises a fourth aperture, extending through the second opaque plug; and the second opaque plug prevents light from passing from the second outer pane into the fuselage except through the second aperture and the fourth aperture.

4. The aircraft of claim 1, wherein respective surfaces, forming the first aperture and the second aperture in the first opaque plug and in the second opaque plug, each have an elliptical or a circular shape.

5. The aircraft of claim 1, wherein:

the first window porthole comprises a first seal, at perimeters of the first outer pane and the first opaque plug;

the first seal holds the first outer pane and the first opaque plug in a spaced apart relationship to form an air gap therebetween;

the second window porthole comprises a second seal, at perimeters of the second outer pane and the second opaque plug; and the second seal holds the second outer pane and the second opaque plug in a spaced apart relationship to form an air gap therebetween.

6. A porthole in an aircraft, having a passenger cabin, the porthole comprising:

a transparent outer pane, comprising a first side, establishing an external surface of the aircraft;

an opaque plug in a facing relationship with a second side of the transparent outer pane, wherein the second side is opposite the first side and the opaque plug comprises a first aperture, extending through the opaque plug, the opaque plug preventing light from passing from the transparent outer pane into the passenger cabin, except through the first aperture; and a seal, at perimeters of the transparent outer pane and the opaque plug, wherein the seal holds the transparent outer pane and the opaque plug in a spaced apart relationship to form an air gap therebetween.

7. The porthole of claim 6, wherein an outer surface of the opaque plug substantially reflects visible light.

8. The porthole of claim 6, wherein a region, surrounding the first aperture in the opaque plug, absorbs light.

9. The porthole of claim 6, wherein the opaque plug further comprises a second aperture, extending through the opaque plug, the opaque plug preventing light from passing from the transparent outer pane into the passenger cabin, except through the first aperture and the second aperture.

10. The porthole of claim 9, wherein:

the opaque plug further comprises a third aperture, extending through the opaque plug, and the opaque plug prevents light from passing from the transparent outer pane into the passenger cabin, except through the first aperture, the second aperture, and the third aperture.

11. The porthole of claim 6, wherein a surface, forming the first aperture in the opaque plug, has an elliptical or a circular shape.

12. The porthole of claim 6, wherein the first aperture is at a center of the opaque plug.

13. The porthole of claim 6, further comprising:

a porthole forging, wherein the seal presses and seals against the porthole forging, thereby preventing air from leaking into the passenger cabin past the transparent outer pane and the opaque plug.

14. A porthole plug in an vehicle, having a passenger cabin, the porthole plug comprising:

a transparent outer pane; and an opaque plug in a facing relationship with the transparent outer pane, and wherein:

the opaque plug comprises a first aperture, extending through the opaque plug, the opaque plug prevents light from passing from the transparent outer pane into the passenger cabin, except through the first aperture, and a surface in the opaque plug, forming the first aperture, has one of a circular or an elliptical shape.

15. The porthole plug of claim 14, further comprising a seal, surrounding a perimeter of the transparent outer pane and a perimeter of the opaque plug, and wherein the seal is arranged in a porthole of the vehicle.

16. The porthole plug of claim 15, wherein:

the seal holds the transparent outer pane and the opaque plug in a spaced apart relationship to form an air gap therebetween;

the porthole plug further comprises a porthole forging; and the seal presses and seals against the porthole forging, thereby preventing air from leaking into the passenger cabin past the transparent outer pane and the opaque plug.

17. The porthole plug of claim 14, wherein an outer surface of the opaque plug, facing the transparent outer pane, is substantially reflective.

18. The porthole plug of claim 17, wherein a region around the first aperture on the outer surface absorbs light.

19. The porthole plug of claim 14, wherein:

the opaque plug further comprises a second aperture, extending through the opaque plug; and the opaque plug prevents light from passing from the transparent outer pane into the passenger cabin, except through the first and second apertures.

20. The porthole plug of claim 19, wherein:

the opaque plug further comprises a third aperture, extending through the opaque plug; and the opaque plug prevents light from passing from the transparent outer pane into the passenger cabin, except through the first aperture, the second aperture, and the third aperture.

* * * * *

UNITED STATES PATENT AND TRADEMARK OFFICE
CERTIFICATE OF CORRECTION

PATENT NO. : 11,407,485 B2
APPLICATION NO. : 16/195449
DATED : August 9, 2022
INVENTOR(S) : Ashley G. Badger et al.

It is certified that error appears in the above-identified patent and that said Letters Patent is hereby corrected as shown below:

In the Claims

In Column 10, Line 64, in Claim 2, delete "aborbs" and insert -- absorbs --.

Signed and Sealed this
Fourth Day of October, 2022

Katherine Kelly Vidal
*Director of the United States Patent and Trademark Office*